ary Examiner—Paul A. Bell
United States Patent [19]
Hawkins

[11] Patent Number: 4,753,008
[45] Date of Patent: Jun. 28, 1988

[54] SEVERING OF TUBES IN STEAM GENERATOR

[75] Inventor: Phillip J. Hawkins, Penn Hills Township, Allegheny County, Pa.

[73] Assignee: Westinghouse Electric Corp., Pittsburgh, Pa.

[21] Appl. No.: 674,442

[22] Filed: Nov. 23, 1984

[51] Int. Cl.⁴ .............................................. B24B 27/06
[52] U.S. Cl. ........................................... 30/96; 30/92
[58] Field of Search ................ 29/33 T, 157.4; 30/92, 30/93–97; 409/178

[56] References Cited

U.S. PATENT DOCUMENTS

| | | |
|---|---|---|
| 1,797,076 | 3/1931 | Davies . |
| 2,759,242 | 8/1956 | Goldman . |
| 3,088,352 | 5/1963 | Tanner ............................ 409/178 X |
| 3,449,992 | 6/1969 | Hanaway . |
| 3,578,233 | 5/1971 | Meister et al. . |
| 3,596,558 | 8/1971 | Rydell ................................ 409/178 |
| 3,653,115 | 4/1972 | Perkins . |
| 3,722,778 | 3/1973 | Rohrberg et al. . |
| 3,942,248 | 3/1976 | Sherer et al. . |
| 3,975,003 | 8/1976 | Buford .............................. 30/97 X |
| 4,091,514 | 5/1978 | Motes-Conners et al. . |
| 4,158,415 | 6/1979 | Young . |
| 4,173,060 | 11/1979 | Massaro et al. . |
| 4,270,258 | 6/1981 | Andrews et al. . |
| 4,385,514 | 5/1983 | Sassak .............................. 30/96 X |

Primary Examiner—Paul A. Bell
Assistant Examiner—Michael D. Folkerts

[57] ABSTRACT

Apparatus for severing primary tubes of steam generator of a nuclear reactor. The tubes are under water because they are radioactive and also because it is undesirable to expose the tubes to oxidation. The tubes are in a confined region of the steam generator affording limited access for cutting. The apparatus includes a file whose cutting surface is cylindrical. The file is located wholly in the region where the tube is clamped within the cooperative clamps which secure the tube for cutting. The file is rotated in cutting engagement with the tube by an air motor. The file is mounted on a slider which is pulled by a cable causing the file to cut through the tube.

7 Claims, 14 Drawing Sheets

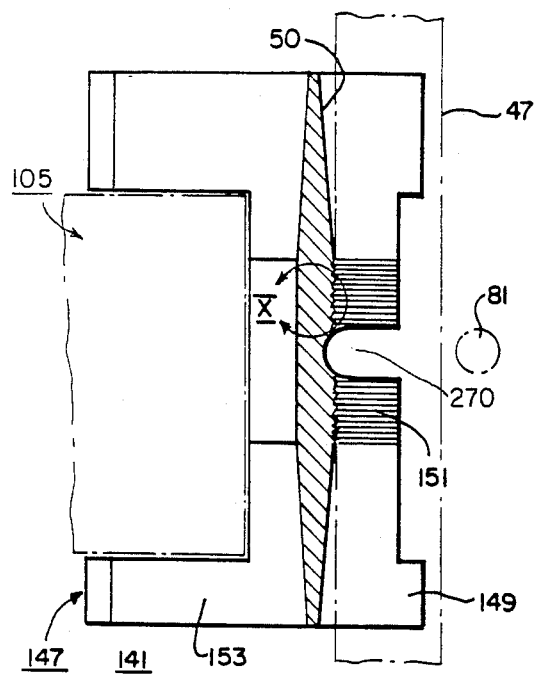
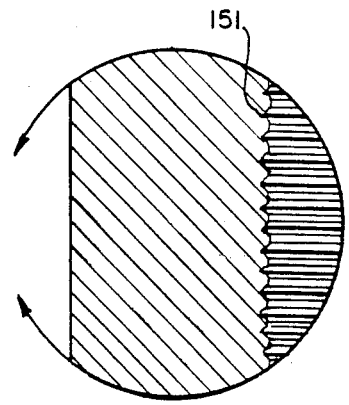
FIG. 9.
FIG. 10.
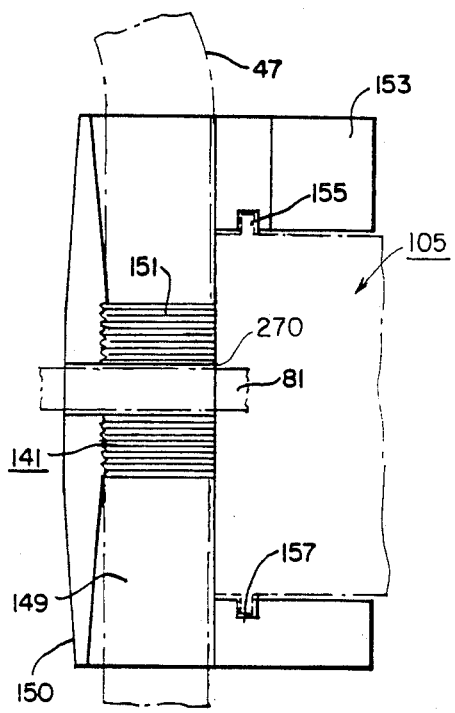
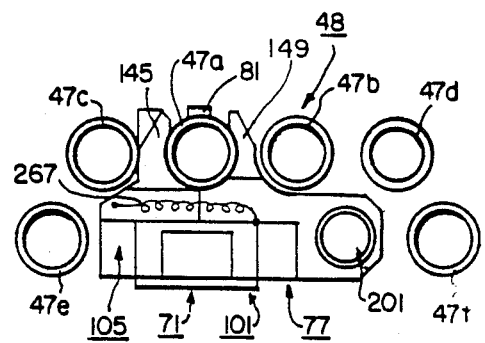
FIG. 11.
FIG. 24.

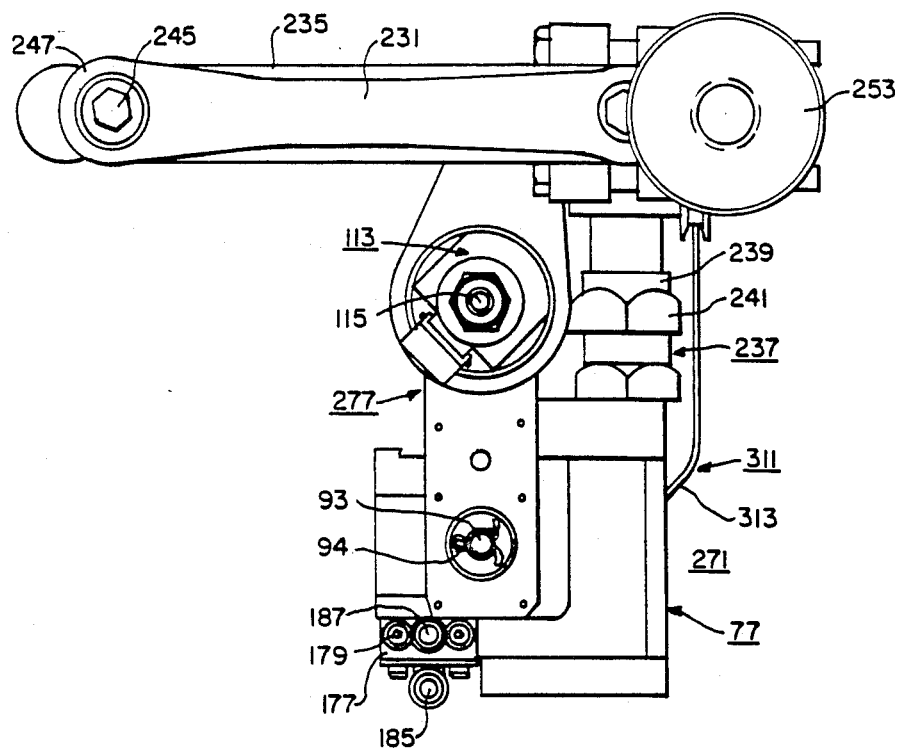
FIG. 26.
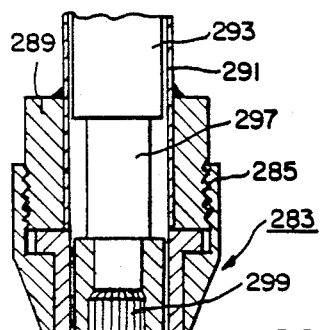
FIG. 28.
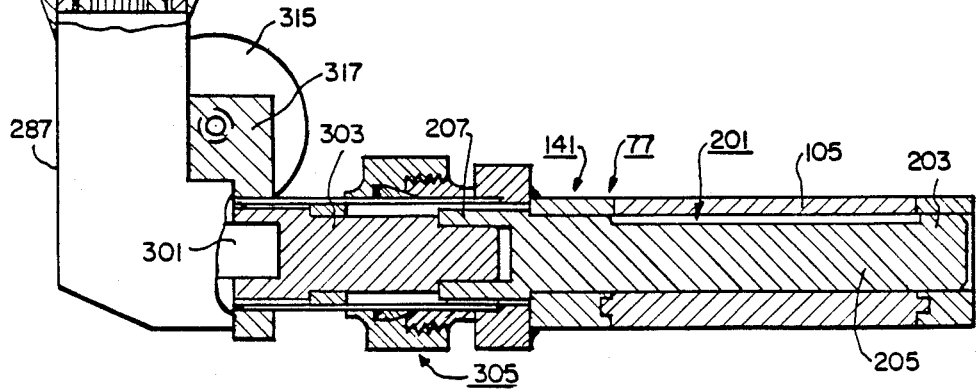

SEVERING OF TUBES IN STEAM GENERATOR

BACKGROUND OF THE INVENTION

This invention relates to nuclear reactor plants. It has particular relationship to the art of inspecting the primary tubes of steam generators of such a plant in instances where defects are suspected. While this invention is uniquely applicable to inspection of tubes of nuclear reactor plants, it may also find utility in the inspection of conventional steam generators and heat exchangers. To the extent that this invention is so applied, such application is regarded as within the scope of equivalents of this invention.

The primary tubes of the steam generator of a nuclear-reactor plant are typically composed of INCONEL alloy. Each tube is typically of U-shape having vertical members joined to a horizontal member by knees. Periodically the tubes are subject to eddy-current tests. The results of such tests indicate that a certain tube requires more detailed inspection and for this purpose parts of a tube must be severed from the remainder and inspected. The primary tubes of a steam generator which have been in service are radioactive. In addition it is undesirable that the tubes be subject to oxidation. For these reasons the tubes are maintained under water in the steam generator. To remove a part of a tube for inspection, it is necessary that remotely actuable tube-cutting apparatus be inserted in the water of the steam generator and perform the cutting in this radioactive environment.

It is frequently desirable that a tube to be inspected be severed. The severance is predominantly along a vertical member's arm but may also take place along the horizontal member or one of the knees. In some steam generators the tubes are confined in a region of limited dimension affording limited access for severing the vertical member of a tube. Grinding wheels or conventional cutters (see, for example, Hanaway U.S. Pat. No. 3,449,992) which are used, in accordance with the teachings of the prior art, in other steam generators, that afford clearance for such grinders or conventional cutters, cannot be used in the steam generators where the access is limited and there is no such clearance. Metal disintegration machining (MDM) has also been proposed. Such machining produces nickel oxide during the machining. The nickel oxide is deposited in the bottom of the steam generator and causes the tubes to crack.

Another problem encountered in attempting to sever the tubes is that they are closely packed: An attempt to cut a tube either along the horizontal member or the vertical members or along the knees between these members with a conventional cutter as disclosed by Hanaway would result in the cutting of several neighboring tubes.

It is an object of this invention to provide apparatus for severing selected primary tubes of a steam generator of a nuclear reactor plant, in which the clearance afforded for a cutter to cut selected tubes is limited and in which the primary tubes are closely packed, without contaminating the steam generator with nickel oxide or other contaminants resulting from cutting by metal disintegration machining or the like, and without cutting a number of tubes in the neighborhood of selected tubes.

It is another object of this invention to provide such apparatus for severing a selected tube either along a vertical members, or along the horizontal member or along the knees between the horizontal and vertical members.

SUMMARY OF THE INVENTION

In accordance with this invention there is provided apparatus for severing the primary tubes of a steam generator in which the cutter is, during the cutting, encompassed by or seated or enclosed within the clamping means which clamps a tube during a cutting operation. Specifically, the cutter is a file whose cutting surface is cylindrical. Since the clamps, the cutter and the tube, in the region where it is to be cut, are assembled into a unit of minimum volume, the apparatus can operate in a confined region affording limited dimensions for clearance. Because the cutter is within the clamping means, cutting of neighboring tubes is precluded. The apparatus is operable remotely from the tube to be cut where there is reduced radiation levels. The clamping means includes a first clamp which is engaged with the tube and a second clamp which is movable into or out of engagement with the tube by rotation of a cam. The cam is rotatable remotely usually manually by a long rod. For cutting a vertical member of a tube the cutter is rotated in cutting engagement with the tube by a motor—usually an air motor since the motor is under water—through a long transmission. The cutter is mounted on a slider which is movable along a track. With the cutter in engagement with a tube the slider is moved along the track by a cable operated remotely causing the cutter mounted on the slider to cut through the tube. The cable may be engaged with the slider on opposite sides. This facility permits the apparatus to be reversed to clear obstruction by the wall of a generator particularly in situations where a tube deep in the generator is to be severed. Apparatus for cutting the horizontal member of a tube is also provided. Such apparatus is similar to the apparatus for cutting the vertical member, except that the transmission need not be as long as for the apparatus for cutting a vertical member.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which:

FIG. 9 is a view in section taken along line IX—IX of FIG. 8;

FIG. 10 is an enlarged view of the portion of the clamp shown in FIG. 9 in the circular area X of FIG. 9;

FIG. 11 is a view in end elevation taken in the direction XI of FIG. 7;

FIG. 24 is a diagrammatic view showing how a selected tube is severed without the necessity of severing neighboring tubes;

FIG. 26 is a plan view taken in the direction XXVI of FIG. 25;

FIG. 28 is a view in longitudinal section taken along line XVIII—XVIII of FIG. 25.

DETAILED DESCRIPTION OF THE PREFERRED EMBODIMENTS

Figure 1:
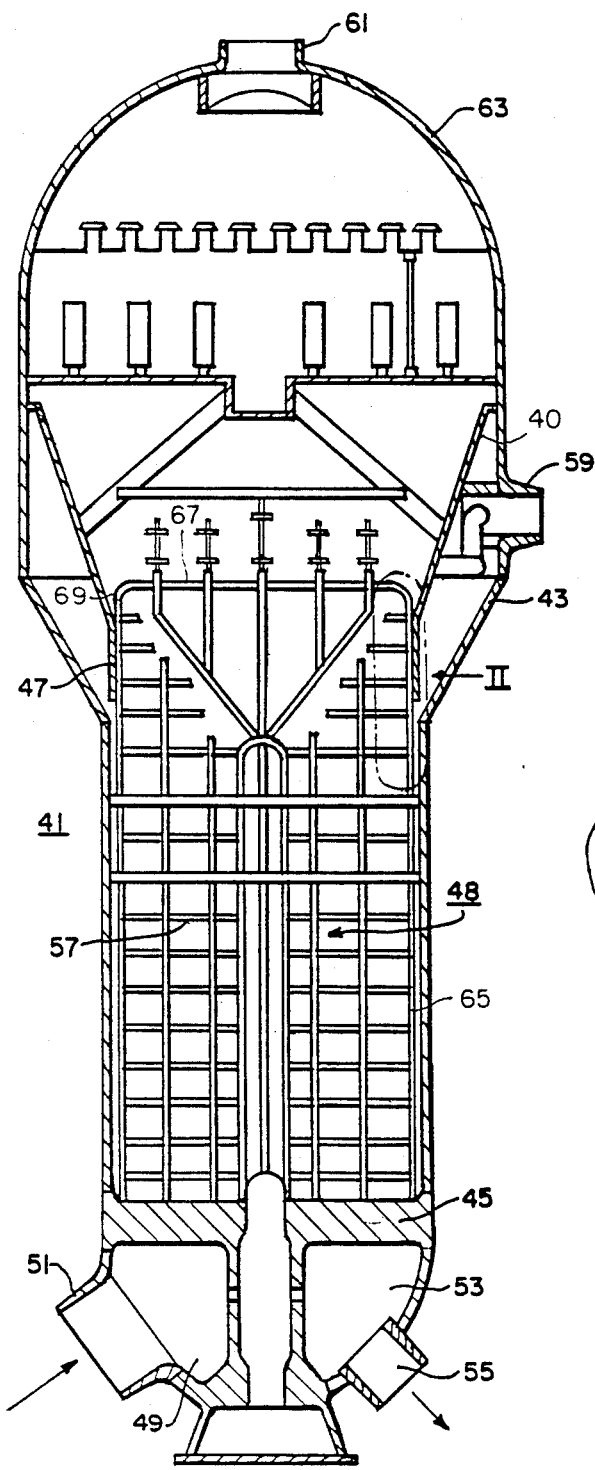
FIG. 1 is a diagrammatic view, essentially a view in longitudinal section, showing the internal structure of a steam generator whose tubes are to be severed in the practice of this invention.
Figure 2:
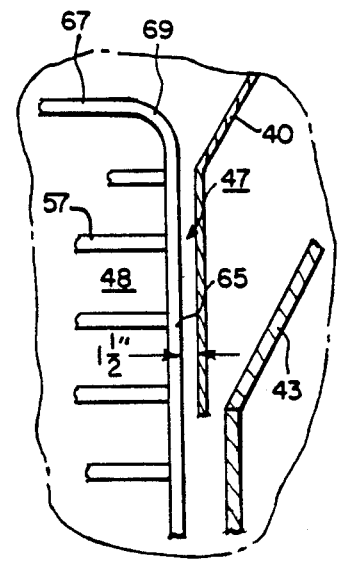
FIG. 2 is an enlarged diagrammatic view showing the portion of the generator in curve II of FIG. 1.

FIGS. 1 and 2 are presented to aid in the understanding of this invention. These views show a steam generator 41 of a nuclear reactor plant. This generator in its most rudimentary form includes a shell 43 within which there is a tube sheet or plate 45. A large number of U-tubes 47 in a closely-packed bundle 48 are sealed through the tube sheet 43. The tubes 47 communicate between an inlet plenum 49 to which the reactor coolant is supplied through an inlet port 51 and an outlet plenum 53 from which the coolant is transmitted to the reactor through an outlet port 55. The tubes 47 are supported by cross members 57. Above the tube bundle 48 a port 59 for feedwater is provided in the shell 43. The feedwater is in heat-exchange relationship with the coolant in tubes 47 and is converted into steam which is transmitted through a port 61 in the dome-shaped top 63 of the generator. In some generators 41 the bundle 48 terminates very near the inner surface of a wrapper 40. As shown in FIG. 2 the tubes 47 in such generators may be only 1½ inches from the wrapper 40.

Periodically the tubes 47 are subjected to eddy-current tests. These tests reveal that parts of selected tubes must be removed for inspection. Where a selected tube 47 is in the periphery of the bundle 48, the part to be inspected is obtained by severing the tube along a vertical member 65 (FIG. 2) or along its horizontal member 67 or along one of its knee 69. Predominantly the tube 47 is severed along one of its vertical membes 65. Where the tube 47 selected for inspection is within the bundle 48 some of the outer tubes must be severed and removed to obtain access to the selected tube. In either case the access for cutting a vertical member or one of the knees of each tube is limited. There is insufficient clearance to insert and operate a conventional cutter. In addition the tubes 47 are closely packed in the bundle 48 and attempts to cut a tube with a conventional cutter, whether the tube is cut along a vertical or horizontal member or at a knee, would result in the cutting of a number of neighboring tubes.

Figure 3:
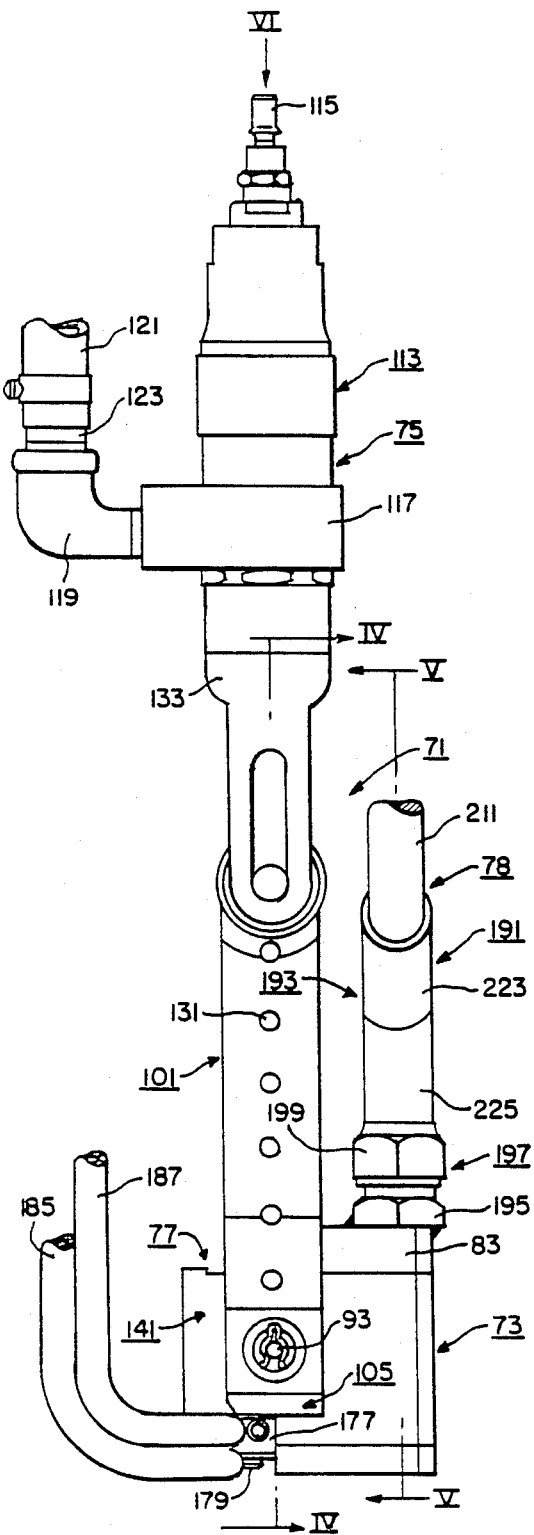
FIG. 3 is a view in side elevation showing apparatus according to this invention for severing a selected primary tube of a steam generator along a tube's vertical member.

FIGS. 3 through 24 show apparatus 71, for severing a selected tube along a vertical member 65, which overcomes the above-stated drawbacks and disadvantages. This apparatus 71 includes a tube-cutter assembly 73, a drive 75 for the tube cutter, clamping means 77 for clamping the tube 47 to be cut, a remotely-actuable mechanism 78 for actuating the clamping means 77 to clamp a selected tube 47 or to disengage the tube, and a mechanism 79 (FIG. 5) for advancing the cutter 81 (FIG. 4) of the cutter assembly 73 through the tube. The mechanism 78 for actuating the clamping means is positionally adjustably supported on a bracket 83 (FIG. 3) extending from the cutter drive 75. The cutter 81 is part of the clamping means 77. The cutter 81 is a file whose cutting surface is cylindrical.

The cutter assembly 73 includes in addition to the file 81 a gear 91 (FIG. 4) to be driven for rotating the file 81. The file 81 has a stem 93 which engages the driven gear 91 coaxially. The stem 93 is secured to the gear 91 by a cotter pin 94. The gear 91 is rotatable in bushings 95 (FIG. 4) which are seated in a slider or dovetail 97. The slider 97 is integral with or connected to the housing 99 of the gear train 101 which forms a part of the cutter drive 75. The slider 97 is slidebale in a track 103 which forms a part of the movable clamp 105 of the clamping means 77. The slider 97 has grooves 107 externally on opposite sides. One or the other of the grooves 107 is engageable by a cable 109 (FIG. 5) which forms a part of the advancing mechanism 79 for the cutter assembly 73. The cable 109 passes through a hole 111 (FIGS. 13, 16) in clamp 105.

The drive 75 (FIG. 4) includes, in addition to the gear train 101 (FIG. 3), an air motor 113. The motor 113 has at its top a coupling 115 for securing an air-input hose (not shown). The air which drives the motor 113 is exhausted through a collector 117 which is connected to an outflow hose 121 through a fitting 119 and a hose connector 123. The drive gear 125 of the motor 113 meshes with the leading gear 127 of the train 101. The gears 127 are rotatable on needle bearings 129 each on a pin 131. Each gear 127 bears a one-to-one speed relationship to the gear which it drives. The driven gear 91 is at the end of the train 101. The gear train 101 is elongated so that the motor 113 and gear train do not interfere mechanically with the engagement of the clamping means 77 and the cutter assembly 73 with the selected tube 47. The whole assembly including the motor 113, the gear train 101, and the cutter assembly 73 are movable together by the cable 109.

Figure 4:
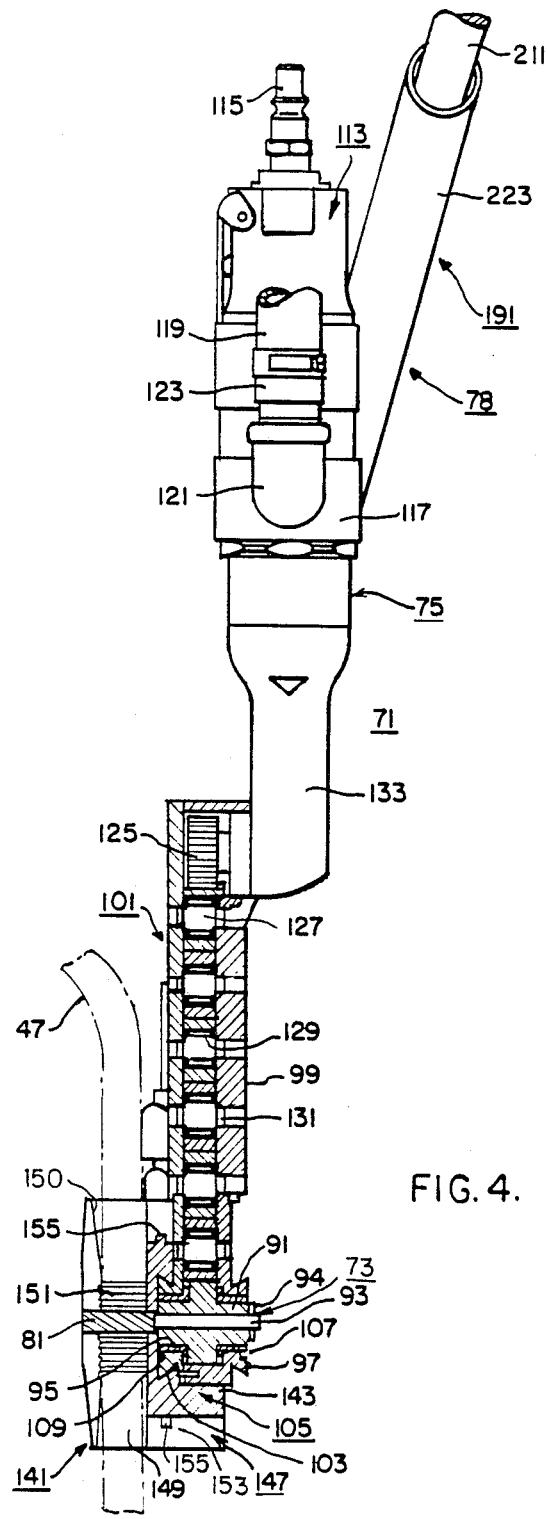
FIG. 4 is a view in longitudinal section taken along line IV—IV of FIG. 3.
Figure 23:
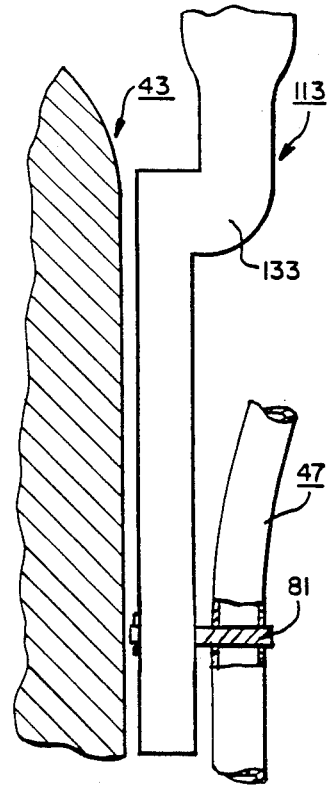
FIG. 23 is a fragmental diagrammatic view showing how the wall of a steam generator is cleared in the cutting of a tube deep in the generator in the practice of this invention.
Figure 25:
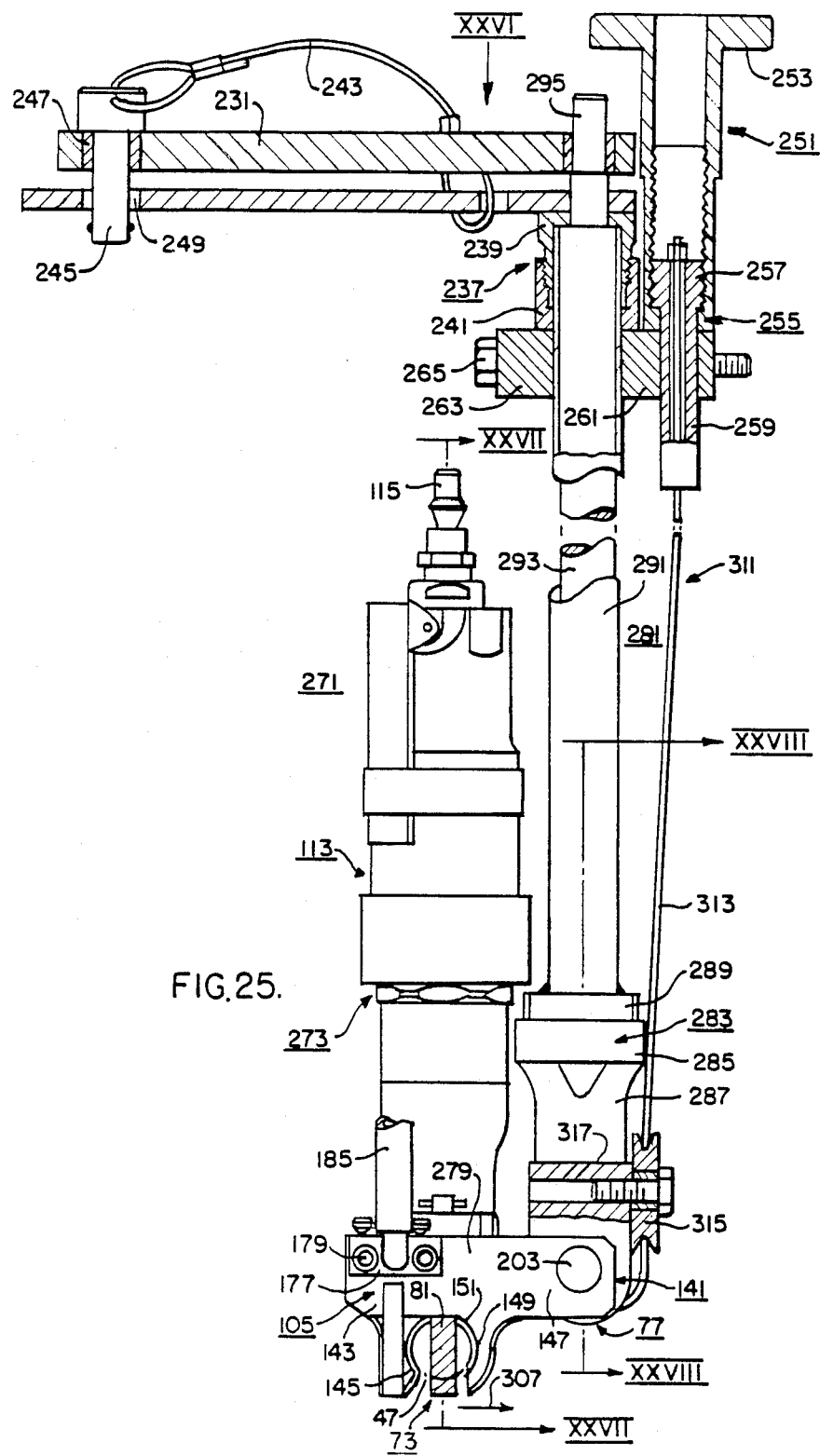
FIG. 25 is a view in side elevation and partly in section of apparatus for severing a tube of a steam generator along the horizontal member.
Figure 27:
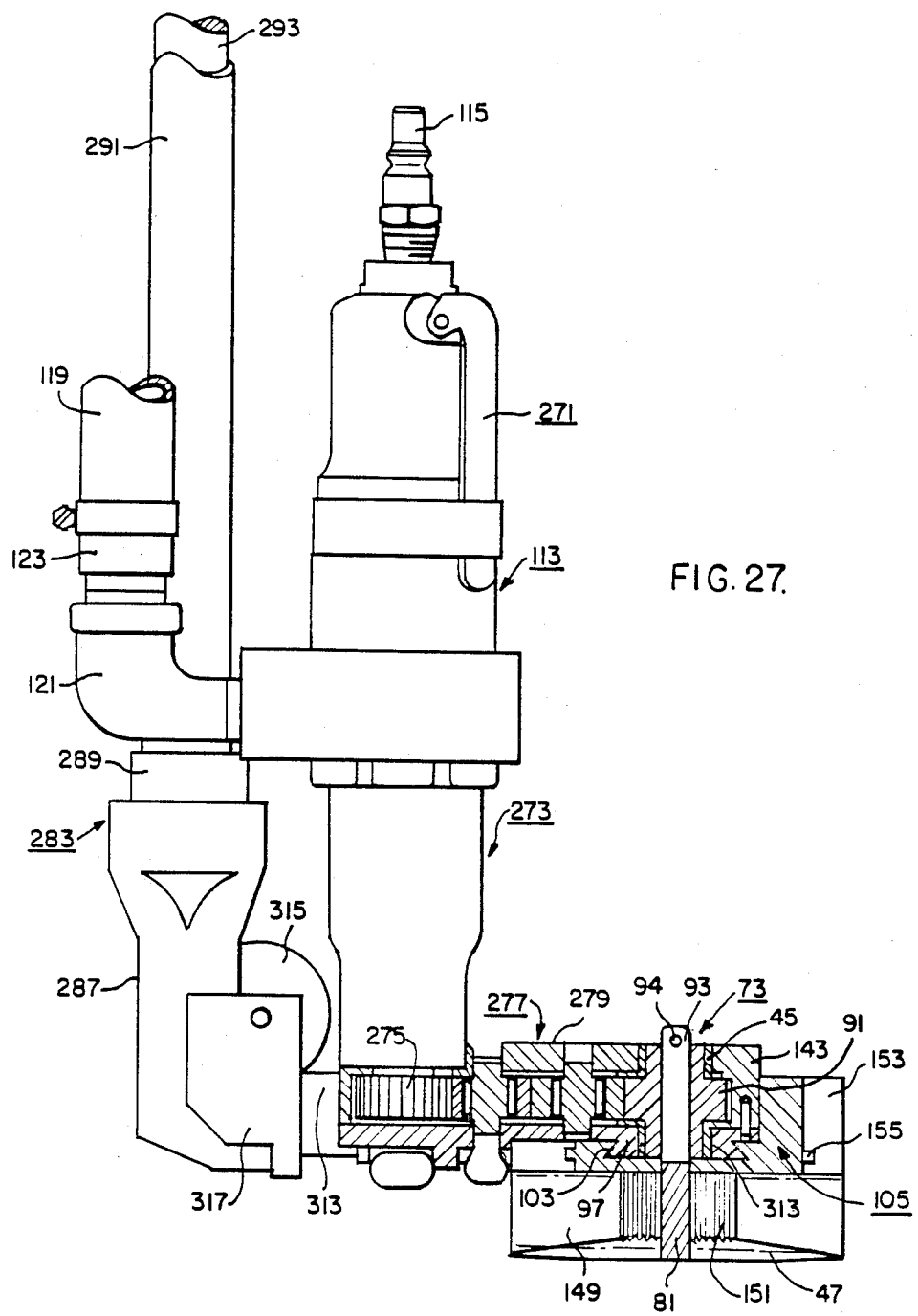
FIG. 27 is a view in longitudinal section taken along line XXVII—XXVII of FIG. 25.
Figure 29:
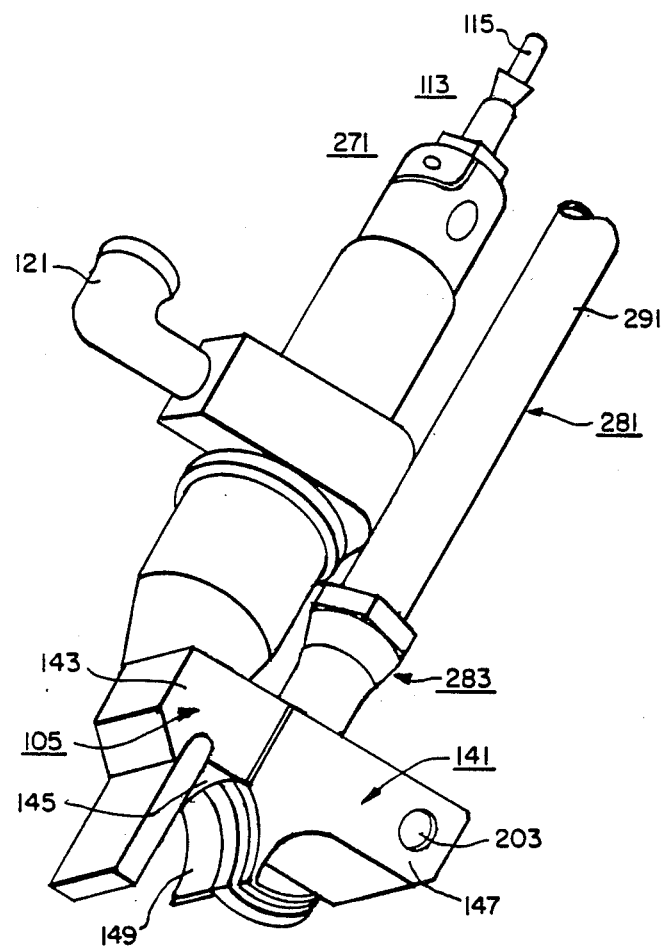
FIG. 29 is a copy of a photograph of apparatus for severing a tube along a horizontal member.

In the event that a tube 47 deep in the generator 41 is to be severed, the apparatus 71 may be positioned with the file 81 on the right or left as viewed in FIG. 4 depending on which positioning the wrapper 43 is cleared. The cable 109 is then inserted in the appropriate slot 107. In FIG. 23 the file 81 is shown on the right and the right-angle drive 133 of the motor 113 is shown clearing the wrapper 43.

Figure 6:
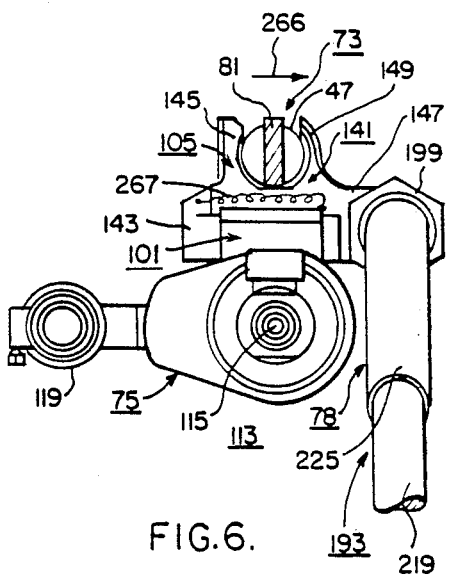
FIG. 6 is a plan view taken in the direction VI of FIG. 3.
Figure 8:
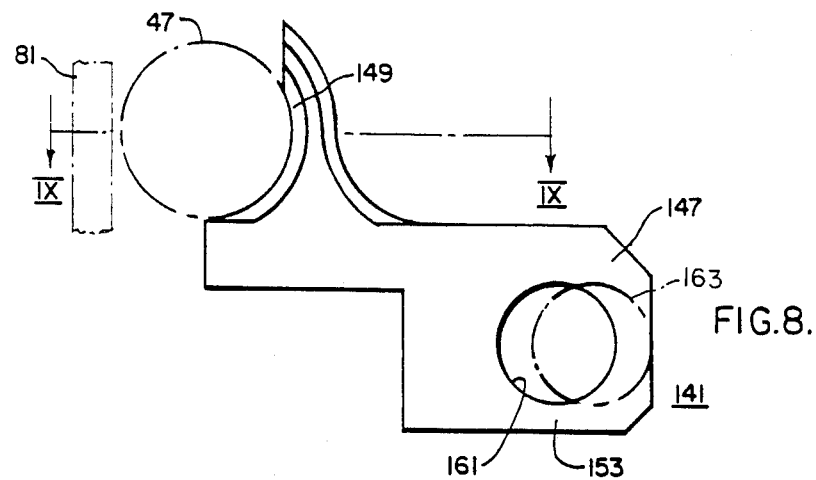
FIG. 8 is a plan view taken in the direction VIII of FIG. 7.
Figure 14:
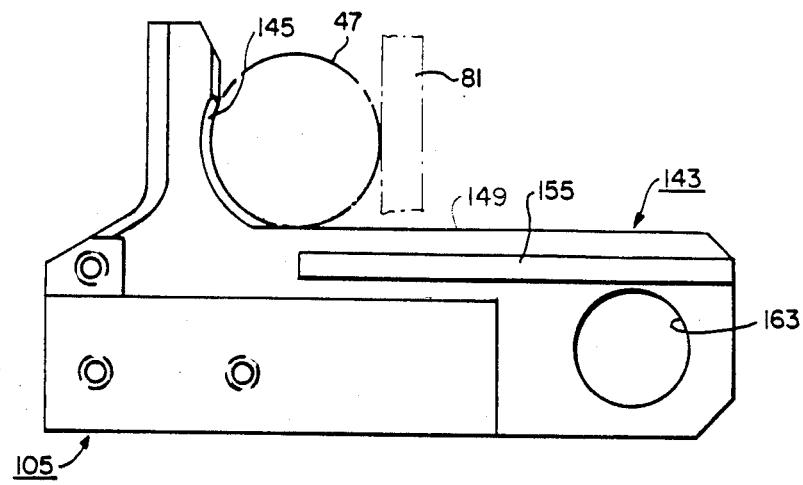
FIG. 14 is a plan view taken in the direction XIV of FIG. 13.

The clamping means 77 includes in addition to the movable clamp 105, the relatively-fixed clamp 141 which is integral with the bracket 83. Clamp 105 has a base 143 from which a claw 145 extends. Clamp 141 has a base 147 from which a claw 149 extends (FIGS. 6, 8, 14). Each claw 145 and 149 has a generally circularly cylindrical arcuate surface shaped and dimensioned to seat on a portion of the surface of a tube 47. A portion 151 (FIGS. 9, 10) of the cylindrical surface of fixed clamp 141 is provided with teeth so as to engage the tube 47 effectively. The end surface 150 (FIGS. 9, 11) of the claw 149 is tapered to facilitate cutting of a tube 47 at a knee. The bases 143 and 147 are so disposed with respect to each other and so interconnected that the cylindrical surfaces are oppositely disposed. The clamp 105 is movable with respect to the clamp 141. Movement of the clamp 105 moves the claw 145 towards and away from the claw 149.

Figure 5:
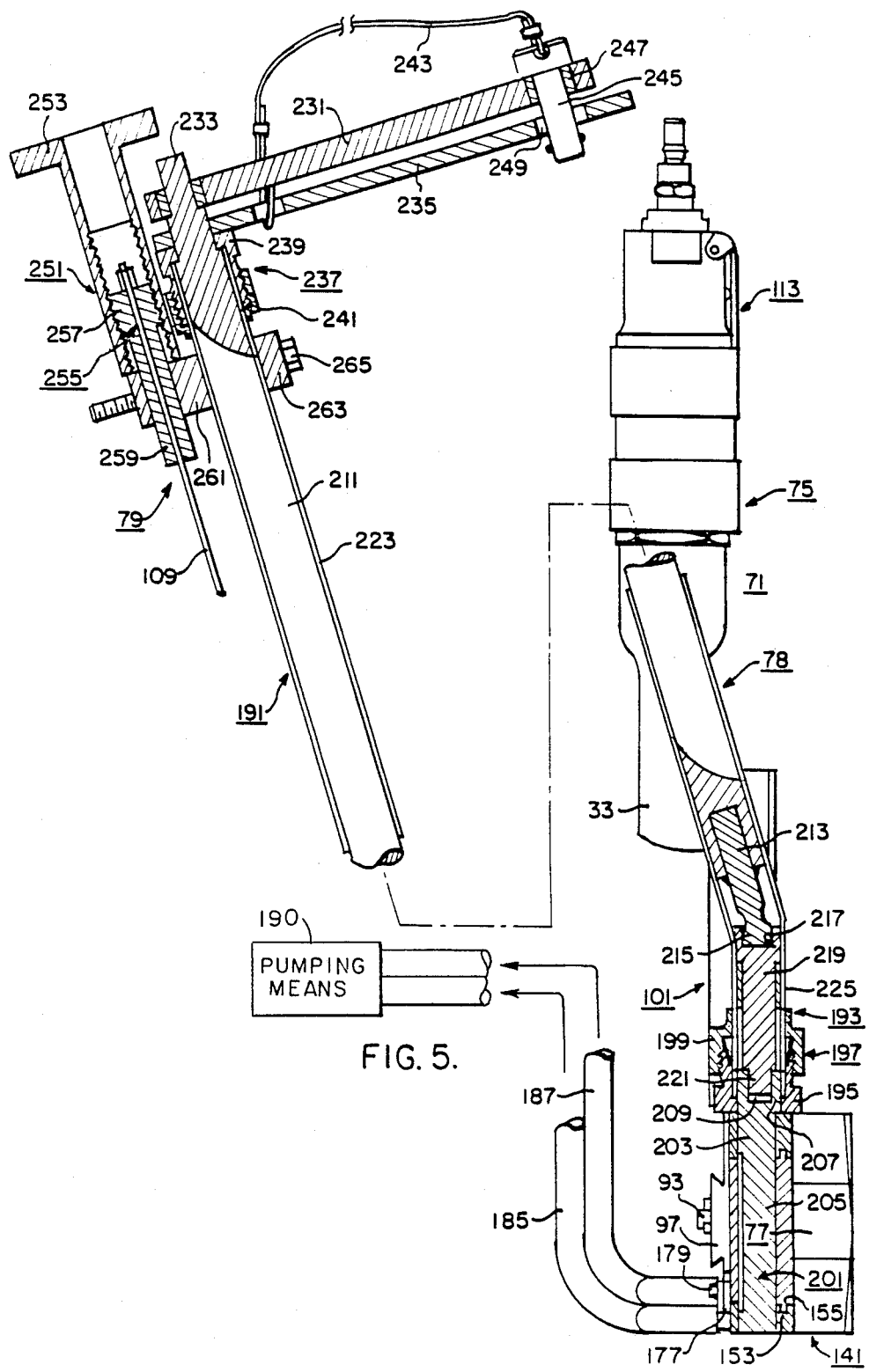
FIG. 5 is a view in longitudinal section taken along line V—V of FIG. 3.

Specifically the base 147 of the clamp 141 has a cavity defined by vertically spaced sides 153 (FIGS. 5, 7, 8, 9) within which the clamp 105 is movable. When clamp 105 moves, it carries with it the cutter assembly 73 and the cutter drive 75 including the slider 97. The cutter assembly 73 is sandwiched between the clamps 105 and 141 and the cutter 81 is sandwiched between the claws 145 and 149 (FIG. 4). The base 143 of clamp 105 has projections 155 at the top and bottom (FIGS. 4, 5, 14) which engage slots 157 in the sides 153 (FIGS. 5, 11). The clamp 105 is thus prevented from being skewed or otherwise improperly displaced during movement. The sides 153 of clamp 141 have circular holes 161 (FIG. 8). The base 143 of clamp 105 has a circular hole 163 (FIG. 14).

Figure 12:
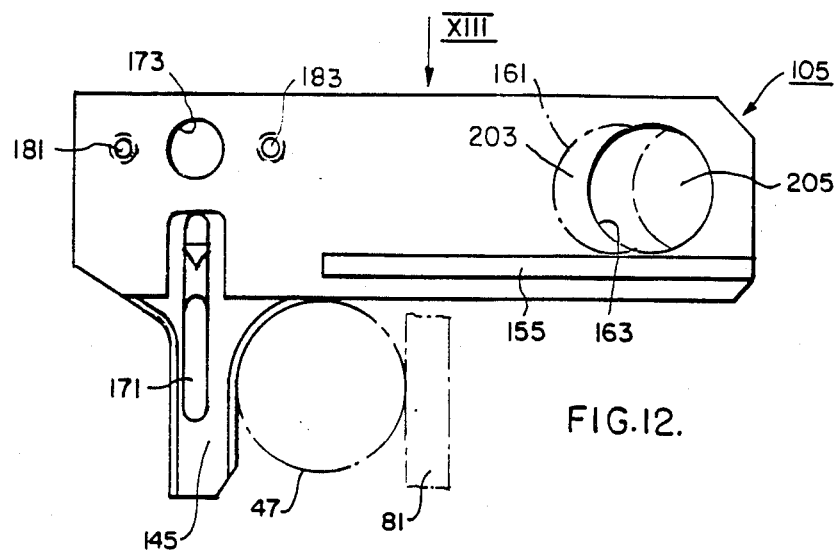
FIG. 12 is a plan view of the relatively movable clamp as seen looking towards the bottom of the clamp.
Figure 15:
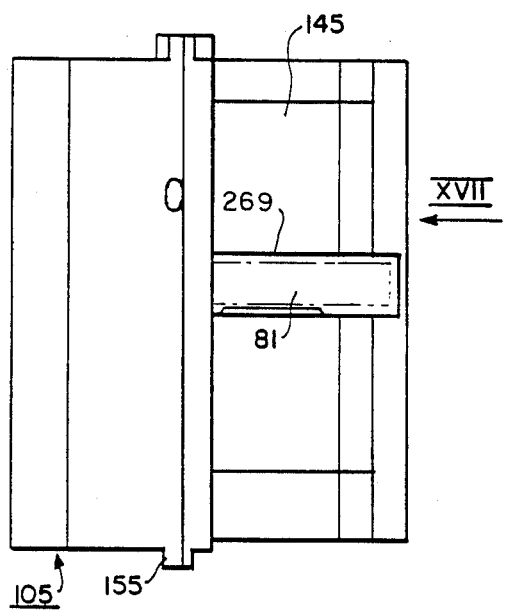
FIG. 15 is a view in end elevation taken in the direction XV of FIG. 13.
Figure 16:
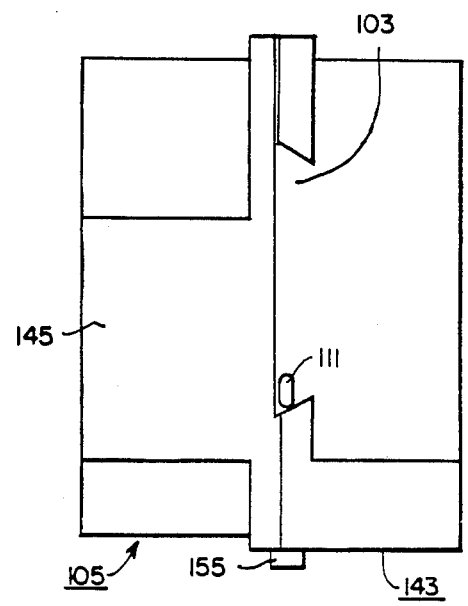
FIG. 16 is a view in end elevation taken in the direction XVI of FIG. 13.
Figure 13:
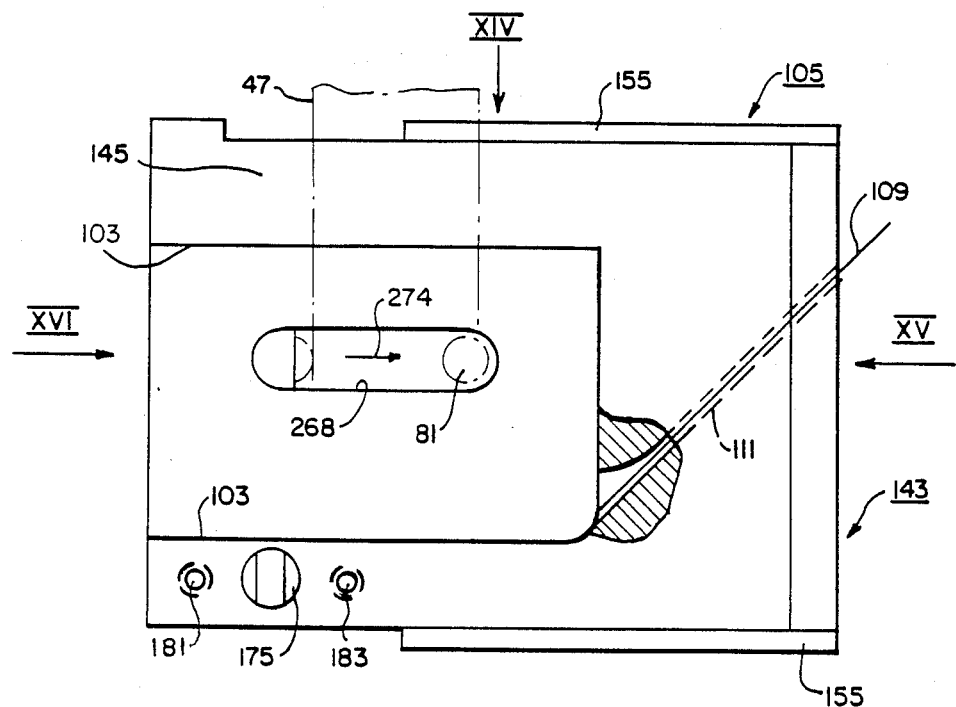
FIG. 13 is a view in side elevation taken in the direction XIII of FIG. 12.
Figure 18:
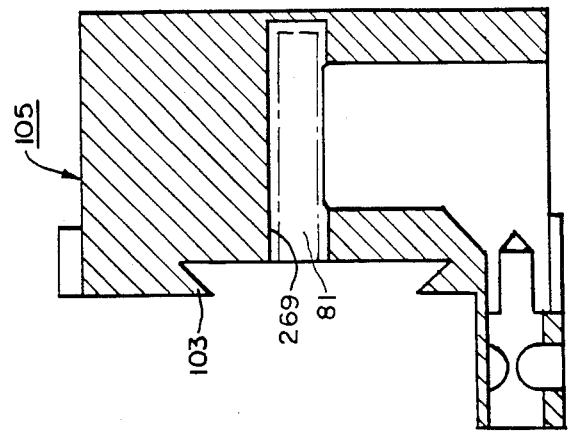
FIG. 18 is a view in transverse section taken along line XVIII—XVIII of FIG. 17.
Figure 17:
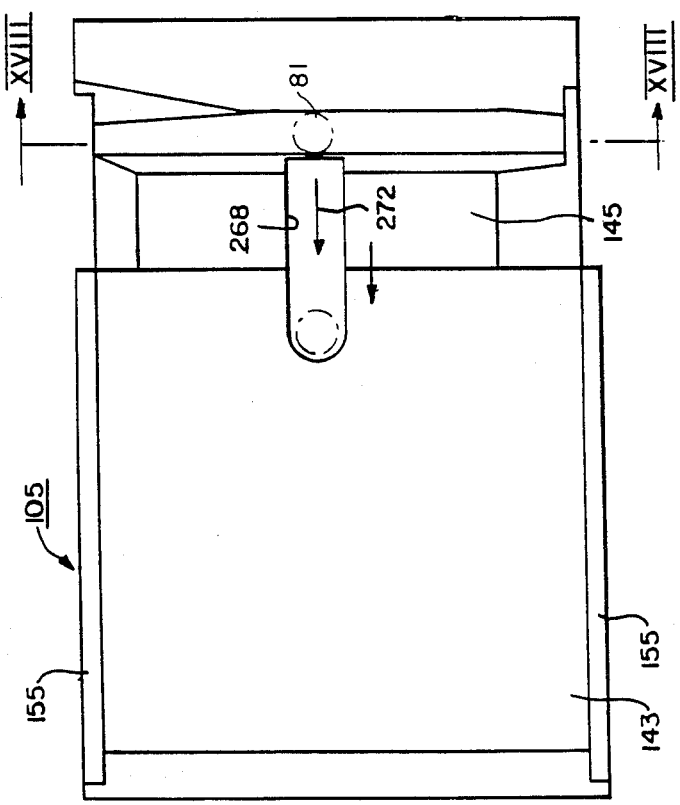
FIG. 17 is a view in side elevation taken in the direction XVII of FIG. 15.
Figure 20:
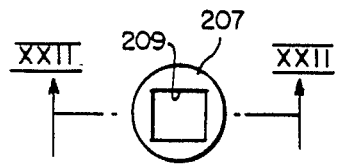
FIG. 20 is a view in end elevation taken in the direction XX of FIG. 19.
Figure 22:
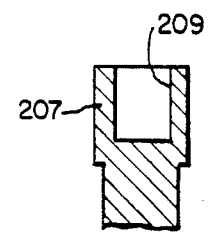
FIG. 22 is a fragmental view in longitudinal section taken along line XXII—XXII of FIG. 20.
Figure 19:
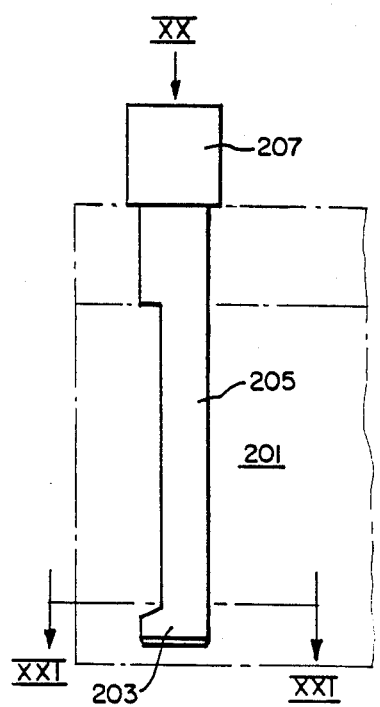
FIG. 19 is a view in side elevation showing the cam for moving the relatively movable clamp into engagement with a tube to be cut.

The clamp 105 has channels 171 (FIG. 12) communicating between the region in which the file 81 engages the tube 45 and openings 173 (FIG. 12) and 175 (FIG. 13). The channels 171 are accessible to the water in which the clamping means 77 and the cutter assembly 73 are immersed. A manifold 177 (FIG. 3) is secured to the movable clamp 105 in communication with the opening 173 and 175, by bolts 179 (FIGS. 5, 13) which engage threaded openings 181 and 183 (FIGS. 12, 13) adjacent the holes 173 and 175. Tubes 185 and 187 (FIG. 3) are connected to the manifold 177. The tubes 185 and 187 are connected to pumping means 190 (not shown) which apply suction to remove the chips from the region where the file 81 engages the tube 47. The file 81 is provided with a chip breaker (not shown) to preclude the accumulation of large cuttings which would not be removable by the suction. Both tubes 185 and 187 carry water and chips away from the cutting region. The flux through the tubes is filtered and the chips removed.

The mechanism 78 (FIGS. 3, 4, 5) for operating the clamping means 77 is elongated extending above the water level in the steam generator 41 so that it may be operated with minimum hazard to personnel from radioactivity. It includes a long section 191 and a shorter section 193 at an obtuse angle, typically about 150° to 165°, to the long section 191 (FIG. 5). Each section 191 and 193 has the shape of a rod of circular section. The angular structure facilitates the positioning of the mechanism 78 and the clamping means 77 so that they clear the wrapper 40 of the steam generator and the clamping means 77 and file 81 may be precisely set to cut the selected tube 47. The mechanism 78 is mounted on the bracket 83. A hollow hex-head bolt 195, which forms a part of a SWAGELOK fastener 197, is joined to the bracket 83 and to the fixed clamp 141. The shorter section 193 of the mechanism 78 passes through the bolt 195 and through the nut 199 of the fastener 195. With the fastener 197 unlocked the mechanism 78 is positioned precisely as desired. Then the fastener is locked.

Figure 21:
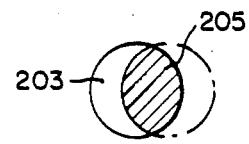
FIG. 21 is a view in transverse section taken along line XXI—XXI of FIG. 19.

The mechanism 78 includes in its shorter section 193 a cam 201 (FIGS. 5, 7, 19–22). The cam 201 has short cylindrical ends 203 of circular section which are joined by a longer section 205. The cross-section of the longer end has the shape defined between a pair of intersecting face-to-face circular arcs (FIG. 21). The outer arc is coextensive with the outer boundaries of the short ends 203. Above the upper end 203, the cam has a head 207 having a square hole 209 (FIGS. 20, 22) through which the cam may be rotated.

Figure 7:
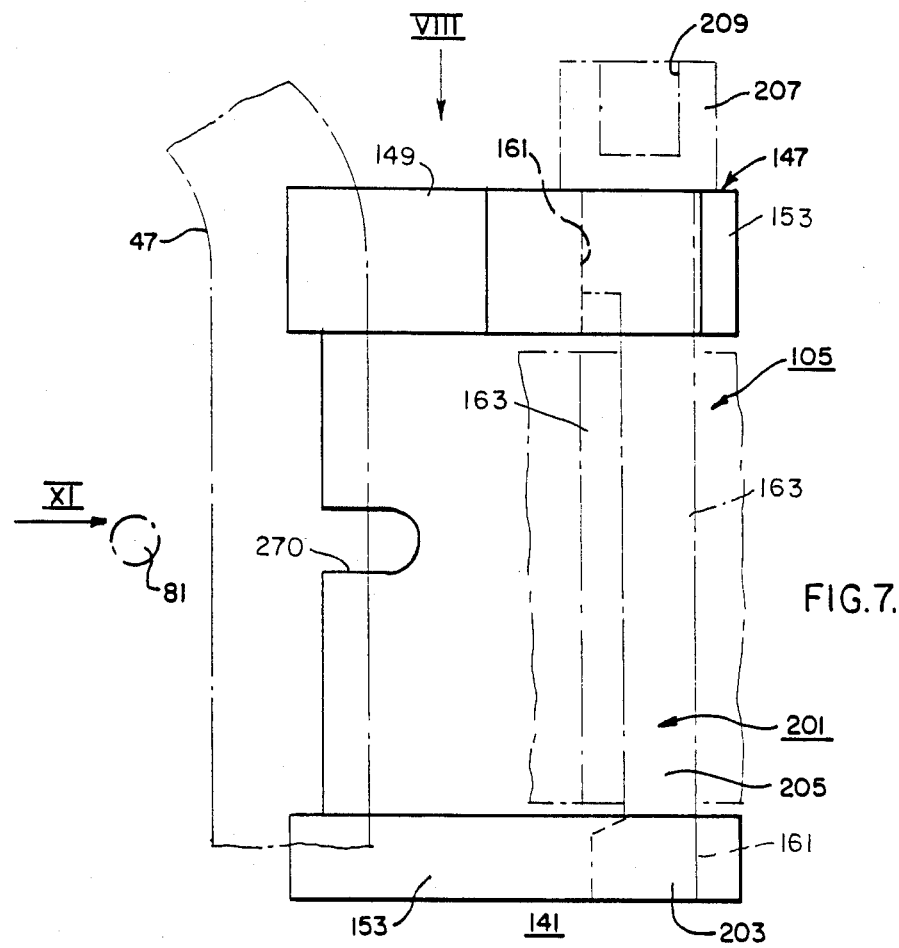
FIG. 7 is a view in side elevation of the relatively fixed clamp of the tube clamping means of the apparatus shown in FIG. 3.

As shown in broken lines in FIGS. 7 and 12 the cam 201 is mounted with its circular ends 203 in the holes 161 of the sides 153 of the fixed clamp 141 and with its center section 205 in the hole 163 in movable clamp 105. The ends 203 are a close fit in the holes 161 but are rotatable in the holes. When the cam 201 is rotated, the movable clamp 105 is advanced by the central section 205 so that its claw 149 is brought into firm engagement with a selected tube 47 or is retracted from such engagement depending on the direction of rotation.

The cam 201 is rotated from a remote position through a long rod or shaft 211 (FIG. 5) which extends along the long section 191 of the mechanism 78. The long rod 211 terminates at its lower end in a short intermediate shaft 213 having a hexagonal ball head 215 at its end. The axis of the shaft 213 and of the head 215 is at the abovementioned obtuse angle to the axis of the short section 193. The hexagonal head 215 engages a hexagonal groove in the boundary of a hole 217 of the head of a short shaft 219. The short shaft 219 is coaxial with the short section 193. The short shaft 219 has a square tip 221 at its lower end which engages the square hole 209 in the head 207 of the cam 201. Rotation of the rod 211 rotates the cam 201 through shaft 213 and 219. The rod 211 and the shafts 213 and 219 are enclosed in a tube. The tube includes a long member 223 extending along the long section 191 which is welded to a short member 225 extending partly over the head 207.

The long rod 211 (FIG. 5) is rotated by a ratchet wrench 231 which engages the attenuated tip 233 of the long shaft. A lock handle 235 is connected to the tube 223 through a SWAGELOK fastener 237. The hollow hex bolt 239 of the fastener 237 is secured to the inner end of the lock handle 235 and the fastening nut 241 is penetrated by the tube 223. By threading the nut 241 onto the bolt 239 the lock handle 235 is secured to the tube 223. A cable 243 is looped through a hole near the inner end of the lock handle 235. At its free end the cable 243 carries a headed lock pin 245. When the wrench 231 is in either of its terminal positions the lock pin 245 is passed through a bushing 247 in a hole in the wrench 231 and a hole 249 in the other end of the lock handle 235 securing the wrench in position. When the wrench 231 is to rotate the rod 211, the lock pin 245 is disengaged from the wrench and lock handle.

The mechanism 79 for advancing the cutter assembly 73 so that the cutter 81 severs a tube 47 includes in addition to the cable 109 an assembly 251 (FIG. 5) for pulling the cable. The cable is connected to the slider 97 and when it is pulled, it pulls the slider along track 103 (FIG. 4). The assembly 251 includes a hollow feed handle 253 internally threaded along the lower portion of its length. The assembly also includes a feed shaft 255 having an externally threaded head 257 and a stem 259 of square transverse cross section. The head 257 is in engagement with the thread in the feed handle 253. The feed shaft has a central hole through which the cable 109 is threaded. The cable is secured at the top of the head 257. The feed shaft 255 is guided by a feed block 261 by which has a square hole penetrated by the stem 259 of the feed shaft. The feed block 261 has a groove of semi-circular transverse section (i.e., a semi-circular cylinder) on its righthand side as seen in FIG. 5. The radius of the groove is substantially equal to the radius of the tube 223. The mechanism also has a clamp 263 having a groove, on the lefthand side as seen in FIG. 5, of the same radius as the groove in the feed block 261. The grooves in the block 261 and clamp 263 engage the tube 223 and are secured together by a clamp bolt 265 which passes through a hole in the clamp 263 and is threaded in a hole in the feed block 261. The hole in the clamp 263 is connected by a slot in the clamp so that the clamp may be slipped onto the bolt 265 after the bolt is threaded into the feed block 261 and may be adjusted. To advance the file 81 through a tube 45 the feed handle 253 is rotated in a clockwise direction as viewed from the top of the knob of the feed handle. The feed shaft 255 is moved upwardly pulling the cable 109 upwardly and advancing the slider 97 and the file 81. The cable may be retracted by rotating the feed handle counterclockwise as viewed in the direction of the top of the handle. The advancing movement of the slider takes place against the action of a spring 267 anchored between the clamp 105 and the slider 97 (FIG. 6). In cutting a tube, the file 81 moves in the direction of the arrow 266 in FIG. 6.

In the use of the apparatus shown in FIGS. 3 through 24, the apparatus is positioned so that the teeth 151 of fixed claw 149 are in engagement with a selected tube 47. With lock pin 245 removed from bushing 247, the ratchet wrench 231 is rotated so that movable claw 145 is brought into engagement with tube 47 oppositely to claw 149. The claws 145 and 149 clamp the tube 47 between them. The lock-pin 245 is inserted into bushing 247 and hole 249 locking the ratchet wrench 231 in position. The motor 113 is now enabled rotating the file 81 which was brought into contact with the tube 47 by the clamping movement of clamp 105. The feed handle 253 is turned to advance the file 81 through the selected tube 47 and severing the tube. The neighboring tubes are not affected since the file 81 is within the clamps 105 and 141.

In a typical situation inner tubes 47a and 47b (FIG. 24) of a tube bundle 48 (FIG. 1) may be selected for removal. To remove these tubes, it is necessary to remove neighboring tubes 47c and 47d. However, with what may be described as righthand apparatus 71 (cam 201 on the right) tube 47e need not be removed to remove tube 47a. To preclude the necessity of removing tube 47f, lefthand apparatus 71 (cam 201 on the left) may be provided.

To aid in the understanding of the structure and operation of the apparatus according to this invention, the tube 47 to be severed and the file 81 are shown in broken lines in the views showing the clamps 105 and 141 and in the other views. The slot 268 shown in FIGS. 13 and 17 and the slots 269 and 270 shown in FIGS. 7, 9, 11, 15 and 18 permit the cutting movement of the file 81 through the selected tube 47. As viewed from above FIG. 13, the file 81 extends down into the plane of the paper and its movement is from left to right as indicated by the arrow 274. As viewed from above FIG. 17, the file extends up from the plane of the paper and its movement is from right to left as indicated by the arrow 272.

The apparatus 271 shown in FIGS. 25—29 serves to cut the horizontal member of a tube 47. This apparatus like the apparatus shown in FIGS. 3—24 includes a cutter assembly 73, a drive 273 for the cutting assembly, clamping means 277, a mechanism 281 for operating the clamping means, and a mechanism 311 for advancing the cutter assembly. Many of the components in this apparatus are the same, or similar to, corresponding components in the apparatus shown in FIGS. 3-24 for cutting the vertical member of a tube 47. Such same or similar components are labeled the same in FIGS. 25-29 as in FIGS. 3-24.

In the apparatus 271 the drive 273 includes the air motor 113 which drives gear 275 (FIG. 27) rotatable about a horizontal axis. The gear 275 drives gear train 277 which in turn drives the cutter assembly 73 through driven gear 91. The gear train 277 is in housing 279 which is connected to, or integral with, the motor 113. The file 81 is thus driven in contact with the horizontal member of the selected tube 47.

The mechanism 281 for operating the clamping means 77 of the apparatus 271 is supported by an angle-head assembly 283 (FIG. 28). The assembly 283 includes a cup-shaped member 285 having a hollow stem 287. The member 285 is threaded internally and a hollow block 289 is threaded into it. The block 289 is welded to an elongated tube 291 extending to a position remote from the angle head assembly 283. Within the tube 291 there is a rod or shaft 293 which extends to a position remote from the assembly 283. The rod 293 has a stepped end 295, at the top (FIG. 250 which is engaged by ratchet wrench 231 and is rotated in the same manner as the rod 211 of the apparatus 71 shown in FIGS. 3-24. There is a stepped end 297 (FIG. 28) at the bottom of the rod 293 which carries a gear 299. The gear meshes with a bevel gear (not shown) which drives a pin 301 at right angles to shaft 293. The pin in turn drives a short shaft 303. The short shaft rotates the cam 201 which advances or retracts the movable clamp 105. The portion of the mechanism including the angle assembly 283 and the parts connected to its; e.g., the tube 291, the rod 293, the short shaft 303 etc., is positionally adjustable with respect to the clamping means 77 and the cam 201. The adjustable portion of the mechanism 77 may be locked in any suitable position by SWAGELOK fastener 305 (FIG. 28). The arrow 307 (FIG. 25) shows the direction of movement of the file 81 during a cutting operation.

The mechanism 311 (FIG. 26) for advancing the slider 97 and the cutter assembly through the selected tube 47 includes a cable 313 which is guided by a pulley wheel 315 (FIG. 25) to the groove of slider 97, where it is connected. The pulley wheel 315 is rotatably mounted on a bracket 317 extending from the anglehead assembly 283. In other respects the mechanism 31 is similar to the mechanism 79 of the apparatus 71 for severing the vertical member of selected tube 47 (FIG. 5).

While preferred embodiments of this invention have been disclosed herein, many modifications thereof are feasible. This invention is not to be restricted except insofar as is necessitated by the spirit of the prior art.

I claim:

1. Apparatus for severing a primary tube of a steam generator of a nuclear reactor plant, said primary tube being positioned in a confined region in a radioactive environment within said steam generator; the said apparatus including tube-clamping means, remotely-actuable means, connected to said tube-clamping means, for actuating said tube-clamping means to clamp and unclamp said primary tube, a tube cutter comprising a file having a cutting surface of generally cylindrical cross section, mounting means for said tube cutter for mounting said tube cutter wholly within said tube-clamping means so that said cutting surface is to be in cutting engagement with said tube, drive means connected to said tube cutter to rotate said file to cut said tube, and remotely-operable means, operable independently of said remotely-actuable means, connected to said mounting means, for advancing said tube cutter to sever said tube as said tube cutter is driven.

2. Apparatus for severing a primary tube of a steam generator of a nuclear reactor plant, said primary tube being positioned in a confined region in a radioactive environment within said steam generator; the said apparatus including tube-clamping means including a first clamp and a second clamp movable relative to said first clamp, said tube to be interposed between said first clamp and said second clamp, the said tube-clamping means also including a cam connected to said second clamp, the said apparatus also including remotely-actuable means for actuating said tube-clamping means to clamp or unclamp said tube, said remotely-actuable means including an elongated member, connected to said cam, for driving said cam remotely from said confined region so that said cam may actuate said second clamp to move into engagement with said tube, said elongated member including a first section and a second section joined to said first section at an angle to said first section, said second section being connected in driving relationship with said cam and said first and second sections including, at their joint, means for driving said second section from said first section whereby on manipulation of said first section said cam is driven, said apparatus also including a tube cutter, mounting means for mounting said tube cutter wholly within said tubeclamping means so as to be in cutting engagement with said tube, drive means, connected to said tube cutter to drive said tube cutter to cut said tube, and remotely-operable means, operable independently of said remotely-actuable means, connected to said mounting means, for advancing said tube cutter to sever said tube as said tube cutter is driven.

3. Apparatus for severing a primary tube of a steam generator of a nuclear reactor plant, said primary tube being positioned in a confined region in a radioactive environment within said steam generator; the said apparatus including tube-clamping means, remotely-actuable means, connected to said tube-clamping means for actuating said tube-clamping means to clamp or unclamp said primary tube, a tube cutter, mounting means for said tube cutter for mounting said tube cutter wholly within said tube-clamping means so as to be in cutting engagement with said tube, drive means, connected to said tube cutter to drive said tube cutter, to cut said tube, and remotely-operable means, operable independently of said remotely-actuable means, connected to said mounting means, said remotely-operable means including a cable and a cable-pulling mechanism, said cable being connected at one end to said tube-cutter mounting means and at the remote opposite end to said cable-pulling mechanism, for advancing said tube cutter to sever said tube as said tube cutter is driven whereby said tube cutter may be operated remotely from said confined region.

4. The apparatus of claim 3 wherein the cutter mounting means includes a slide and a track along which said slide is slidable and the cable is connected at the one end to the slide.

5. Apparatus for severing a primary U-shaped tube of a steam generator of a nuclear reactor plant, said tube having a horizontal and a vertical member and to be severed along said vertical member, said primary tube being positioned in a confined region in a radioactive environment within said steam generator; the said apparatus including tube-clamping means, remotely-actuable means, connected to said tube-clamping means for actuating said tube-clamping means to clamp or unclamp said primary tube, a tube cutter, mounting means for said tube cutter for mounting said tube cutter wholly within said tube-clamping means so as to be in cutting engagement with said tube, drive means, connected to said tube cutter to drive said tube cutter, to cut said tube, said drive means including a motor, a driving gear driven by said motor, a driven gear connected to said tube cutter, and an elongated idler-gear-train, interconnecting said driving gear and said driven gear, said idler-gear-train being of such length that said motor is remotely disposed externally of said confined region, and remotely operable means, operable independently of said remotely-actuable means connected to said mounting means, for advancing said tube cutter to sever said tube as said tube cutter is driven.

6. Apparatus for severing a primary tube of a steam generator of a nuclear-reactor plant; said primary tube being positioned in a confined region in a radioactive environment within said steam generator; the said apparatus including tube-clamping means, remotely-actuable means, connected to said tube-clamping means, for actuating said tube-clamping means to clamp or unclamp said tube, tube-severing means including a tube cutter, means, connected to said tube-severing means, for mounting said severing means with said tube cutter positioned in cutting engagement with a tube, and remotely-operable means operable independently of said remotely-actuable means, connected to said tubesevering means, for operating said tube-cutter to sever said tube, said remotely-operable means including a flexible elongated member and pulling means for said elongated member, said elongated member being in engagement with said tube-severing means and with said pulling means at the end remote from said tube-severing means, said elongated member being pulled by said pulling means in the operation of said remotelyoperable means to advance said tube-cutter through said tube to sever said tube.

7. Apparatus for severing a primary tube of a steam generator of a nuclear reactor plant, said primary tube being positioned in a confined region in a radioactive environment within said steam generator; the said apparatus including tube-clamping means, remotely-actuable means, connected to said tube-clamping means, for actuating said tube-clamping means to clamp or unclamp said primary tube, a tube cutter, mounting means for said tube cutter for mounting said tube cutter wholly within said tube-clamping means so as to be in cutting engagement with said tube, drive means, connected to said tube cutter to drive said tube cutter, to cut said tube, and remotely operable means, operable independently of said remotely-actuable means connected to said mounting means, for advancing said tube cutter to sever said tube as said tube cutter is driven, said tube-clamping means including a channel communicating between the region where said tube cutter is to cut said tube and the region external to said tube-clamping means, the said apparatus also including chip-removing means for removing the chips generated by the cutting of said tube from the region where said tube cutter is to cut said tube, said chip-removing means including rumping means for applying suction to remove said chips.

* * * * *